United States Patent [19]

Lair

[11] Patent Number: 5,372,006
[45] Date of Patent: Dec. 13, 1994

[54] TURBINE ENGINE EQUIPPED WITH THRUST REVERSER

[75] Inventor: Jean-Pierre Lair, San Antonio, Tex.

[73] Assignee: Aeronautical Concept of Exhaust, Ltd., San Antonio, Tex.

[21] Appl. No.: 14,550

[22] Filed: Feb. 8, 1993

[51] Int. Cl.⁵ ............................................. F02K 3/02
[52] U.S. Cl. ................... 60/226.2; 60/226.3; 60/230; 60/232; 60/271; 244/110 B; 239/265.19; 239/265.33
[58] Field of Search ................ 60/226.2, 230, 232, 60/262, 271, 226.3; 244/110 B; 239/265.19, 265.33, 265.35, 265.37

[56] References Cited

U.S. PATENT DOCUMENTS

| | | | |
|---|---|---|---|
| 3,386,247 | 6/1968 | Gross et al. | 60/226.2 |
| 3,856,239 | 12/1974 | Leibach | 60/226.2 |
| 4,147,027 | 4/1979 | Greathouse | 60/226.2 |
| 4,362,015 | 12/1982 | Fage | 60/226.2 |
| 4,577,814 | 3/1986 | Bayle-Laboure et al. | 60/232 |
| 4,581,890 | 4/1986 | Giraud | 60/262 |
| 4,592,201 | 6/1986 | Dusa et al. | 60/262 |
| 5,181,676 | 1/1993 | Lair | 60/226.2 |
| 5,221,048 | 6/1993 | Lair | 60/271 |

Primary Examiner—Richard A. Bertsch
Assistant Examiner—Howard R. Richman
Attorney, Agent, or Firm—Harold H. Dutton, Jr.

[57] ABSTRACT

A thrust reverser system for a turbine engine of the type having a central relatively hot gas generator nozzle conducting a core flow and a relatively cold duct conducting a fan flow and surrounding the hot flow, a pair of thrust reverser door, each of the doors being pivotally mounted on an axis which is substantially diametrically positioned with respect to the exhaust nozzle of the engine so as to pivot between a stowed position in which the doors are out of the direct path of exhaust from the engine and a deployed position in which the doors are in the path of the engine exhaust for deflecting the exhaust and creating a braking thrust, a flow modifying arrangement acting on the hot gas generator nozzle for simultaneously decreasing the total pressure of the core flow and increasing the total pressure of the fan flow by increasing the area of the hot gas generator nozzle at the discharge end thereof and moving the boundary between the hot gas and cold gas flows radially outwardly.

25 Claims, 10 Drawing Sheets

TURBINE ENGINE EQUIPPED WITH THRUST REVERSER

This invention relates to a turbine engine equipped with a thrust reverser, especially the type used on aircraft. More particularly, the invention relates to a turbine engine of the double flow type provided with a thrust reverser, and providing for area variation of the hot central nozzle.

BACKGROUND AND OBJECTS OF THE INVENTION

In order to reduce the landing distance of a jet engine powered aircraft, as well as to increase the margin of safety when the aircraft is landing on a wet or icy runway, aircraft jet engines are provided with thrust reversers in order to provide a braking thrust for the aircraft. Typically, such thrust reversers are formed by thrust reverser "doors" which are capable of pivoting between two positions about an axis which is transverse and substantially diametrical with respect to the jet of the engine.

The first position finds the doors in a stowed position, out of the direct path of the exhaust blast of the engine. In this position, the doors form the exhaust nozzle of the gas turbine engine so that the thrust of the engine is directly rearward, thereby producing the forward thrust of the aircraft. In the second position, the doors are pivoted about the pivot axis to a transverse, blast deflecting or deployed position, to intercept and redirect the jet blast and produce the braking thrust for the aircraft when needed.

The jet engines which utilize such thrust reversers are typically of the double jet type of gas turbine engines. Such engines comprise a central generator which emits a jet of hot gas, and an annular by-pass conduit surrounding the central generator, and through which passes a jet of relatively cold gas. In practice, the central or hot jet emits gas flow at a high temperature on the order of 500° C. to 600° C., while the by-pass flow is at a temperature considered relatively cold, i.e. on the order of 100° C.

When a thrust reverser is used with such double flow engines, the thrust reverser re-directs in a forward direction the hot and cold flows, in order to produce the braking thrust. Since the hot, central flow impinges on the thrust reverser doors, they must be made of heat resistant material. In general, the material used for the thrust reverser doors is either steel or a titanium alloy. However, steel is a relatively heavy metal, and while titanium alloys are much lighter, they are considerably more expensive. Aluminum is a very desirable material for the thrust reverser doors, but because of the high temperature of the hot flow, aluminum cannot be used.

In the past, attempts to overcome the drawbacks of conventional double flow engines have been made, for example in U.S. Pat. Nos. 4,362,015 and 4,581,890. For example, it has been proposed to provide an obstruction in the nature of flaps for obstructing a portion of the discharge outlet area of the exit end of the by-pass conduit when the thrust reverser is deployed. According to U.S. Pat. No. 4,362,015, the flaps restrict the flow of cold gas in by-pass conduit. In U.S. Pat. No. 4,581,890, the flaps are said to briefly reduce the efficiency of the flow mixing and causing the cold by-pass flow to contact the structure of the reverser, which was thereby maintained at a lower temperature. More precisely, this prior system increased (in thrust-reversing mode) the value of the ratio of the total pressure of the by-pass flow (i.e. the cold flow) to the total pressure of the hot flow, so that only the cold flow impinges on the reverser doors, thereby enabling the use of aluminum alloy doors.

However, it has been found that when such systems are applied to turbine engines that significant drawbacks arise. In essence, tests have shown that the engine rating must be kept reduced in the reverse mode in order to avoid surging the engine and raising the skin temperature of the thrust reverser doors. This is particularly true when the central nozzle of the gas generator is of the mixer type. The limitations found in the prior art systems are primarily due to the means used to control the value of the ratio of the fan pressure to the core pressure $P_{T(fan)}/P_{T(core)}$. The prior art systems sought to increase this ratio by directly changing the flow characteristics of the fan and increase the fan pressure by mechanically restricting the fan flow by-pass area in the reverse mode, while only indirectly affecting the core flow.

As described in U.S. Pat. Nos. 4,362,015 and 4,581,890, these systems directly act on the total pressure of the fan flow so as to increase it, thereby increasing the ratio. This is done by using flaps in the cold flow to increase the pressure of the cold flow. However, the prior systems have no significant direct effect, and only insignificant indirect effect, on the value of the total pressure of the core flow. Ordinarily, the ratio would be on the order of 0.9–1.0, and through the use of the flap techniques disclosed in these prior patents, the ratio was increased to a value at most on the order of 1.2. Experience has shown that in some cases it has been necessary to install more than two, for examples 3 or 4, flaps in the fan stream to adequately increase the pressure ratio of $P_{T(fan)}/P_{T(core)}$ in reverse. As a result, the value of the total pressure ratio (fan/core) is increased in reverse, but mainly by the increase of the $P_{T(fan)}$. However, this is not desirable for the engine, as it increases the risk of surging of the engine. It is significant that in accomplishing the increase in the ratio, only the by-pass flow was acted upon, and this by the use of two or more flaps obturating the fan stream at the outlet end of the bypass conduit.

Accordingly, a primary object of the present invention is to overcome the drawbacks of the prior art thrust reverser systems.

Another object of this invention is to provide a thrust reverser which can use lightweight, inexpensive alloys such as aluminum, or composite materials, for the thrust reverser doors.

A further object of the invention is to provide an improved thrust reverser which operates with a significant increase in the ratio of the pressure of the fan flow to the pressure of the core flow when the thrust reverser is deployed.

Yet another object of the invention is to provide an improved thrust reverser system which increases the ratio of the total fan flow pressure to the total core flow pressure by directly acting upon the core flow.

Still another object of the invention is to provide an improved thrust reverser system which increases the ratio of the total fan flow pressure to the total core flow pressure by increasing the area of the hot gas nozzle while decreasing the area of the fan duct.

Still a further object of the invention is to provide an improved double flow jet engine which enables the use of a thrust reverser made of lightweight materials, by providing a nozzle which enables a mixing of the hot and cold flows with simultaneous decreasing of the total pressure of the hot flow and increasing the total pressure of the cold flow.

Another object of this invention is to provide a process for improving the efficiency of a double flow turbine engine by adjusting the mixing of the cold and hot flows, thereby simultaneously increasing the total pressure of the cold flow and decreasing the total pressure of the hot flow, by acting directly and primarily on the hot flow stream.

These and other objects and advantages of the invention will become apparent from a detailed consideration of the following description and claims, when taken together with the accompanying drawings.

DESCRIPTION OF THE INVENTION

According to the present invention, the total pressure of each flow stream, both core and fan, is changed. However, an increase in the pressure of the cold flow is generally only possible with very narrow limits, dictated by the surge margin of the low pressure compressor. Therefore, the total pressure of the fan flow is increased to a slight extent, while the total pressure of the core flow is decreased to a greater extent, so that the ratio $P_{T(fan)}/P_{T(core)}$ is significantly altered. In this manner the risk of surging the low pressure compressor of the engine is minimized. This, then, is accomplished by varying the exhaust area of the central generator nozzle, in the reverse thrust mode. In reverse, the exhaust area of the central nozzle is increased in conjunction with the deployment of the reverser doors. In the forward thrust mode, during take-off and climb, the exhaust area of the central nozzle is increased in conjunction with the throat area variation of the final exhaust nozzle.

This invention not only allows a significant weight reduction of the thrust reverser doors (since lightweight aluminum alloy or composite material may be used) but also allows further improvements of engine performance when the engine is fitted with a thrust reverser which integrates a variable exhaust area nozzle as described in U.S. Pat. No. 5,181,676, or with a non-reversing variable exhaust area nozzle as described in my U.S. Pat. No. 5,221,048, the specifications of both of which are incorporated herein by reference.

DESCRIPTION OF THE DRAWINGS

This invention will be described in greater detail by way of reference to the accompanying drawings, which show by way of non-limiting examples, certain preferred features and embodiments of this invention, and in which.

DETAILED DESCRIPTION OF PREFERRED EMBODIMENTS

Figure 1:
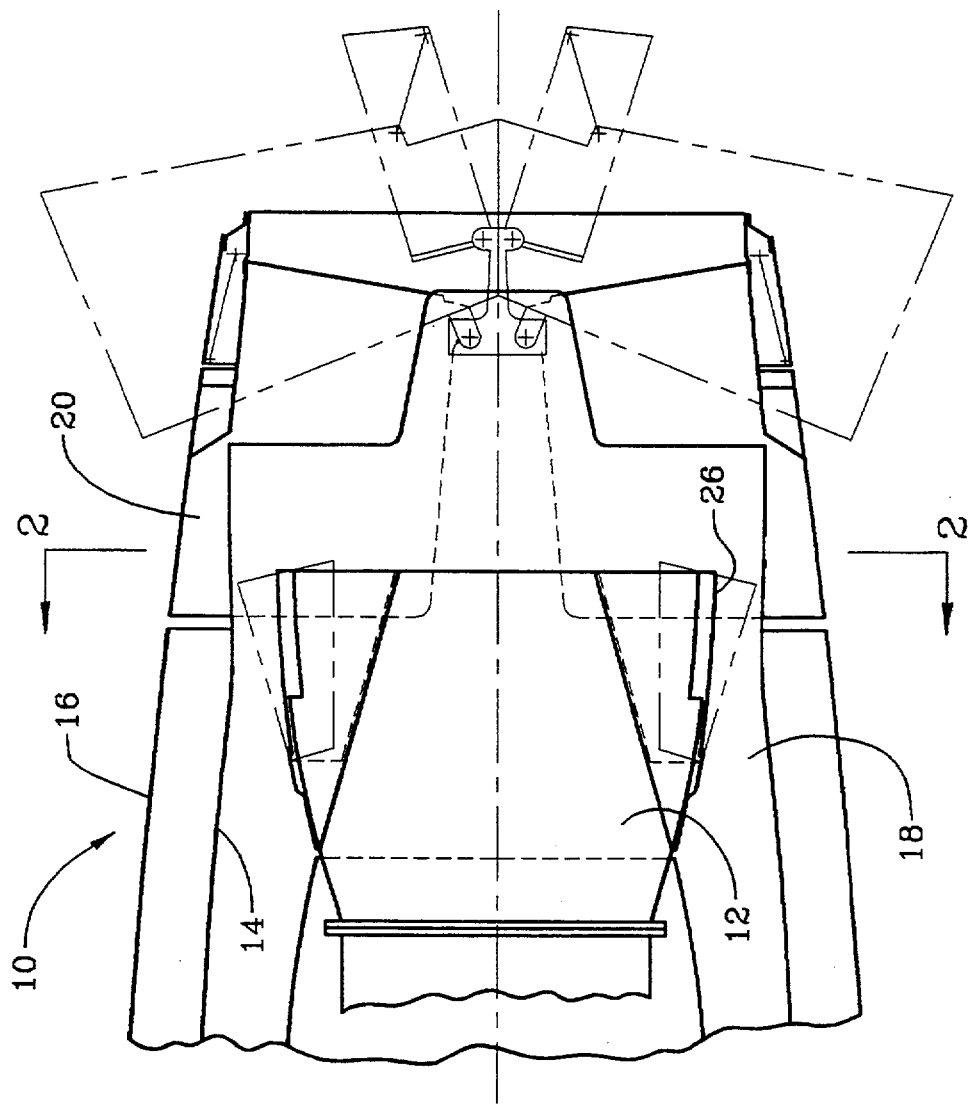
FIG. 1 is a cross-sectional schematic view of the rear portion of a turbine engine fitted with a central mixing nozzle.

Referring first to FIG. 1, the rear portion of a turbine engine 10 is shown, and is provided with a central hot gas generator 12 of the mixing type. This hot gas generator of 12 is surrounded by a peripheral fixed structure which is formed by an inner skin 14 and an outer skin 16. The annular conduit 18 is formed between the inner skin 14 and the hot gas generator 12, and provides a passage for the by-pass flow of fan air, which is at relatively cold temperatures. On the downstream end of the inner skin 14 is installed a thrust reverser which is of the target type, formed of two doors 20. Preferably this thrust reverser is of the type described in U.S. Pat. Nos. 5,176,340 and 5,181,676.

Figure 2:
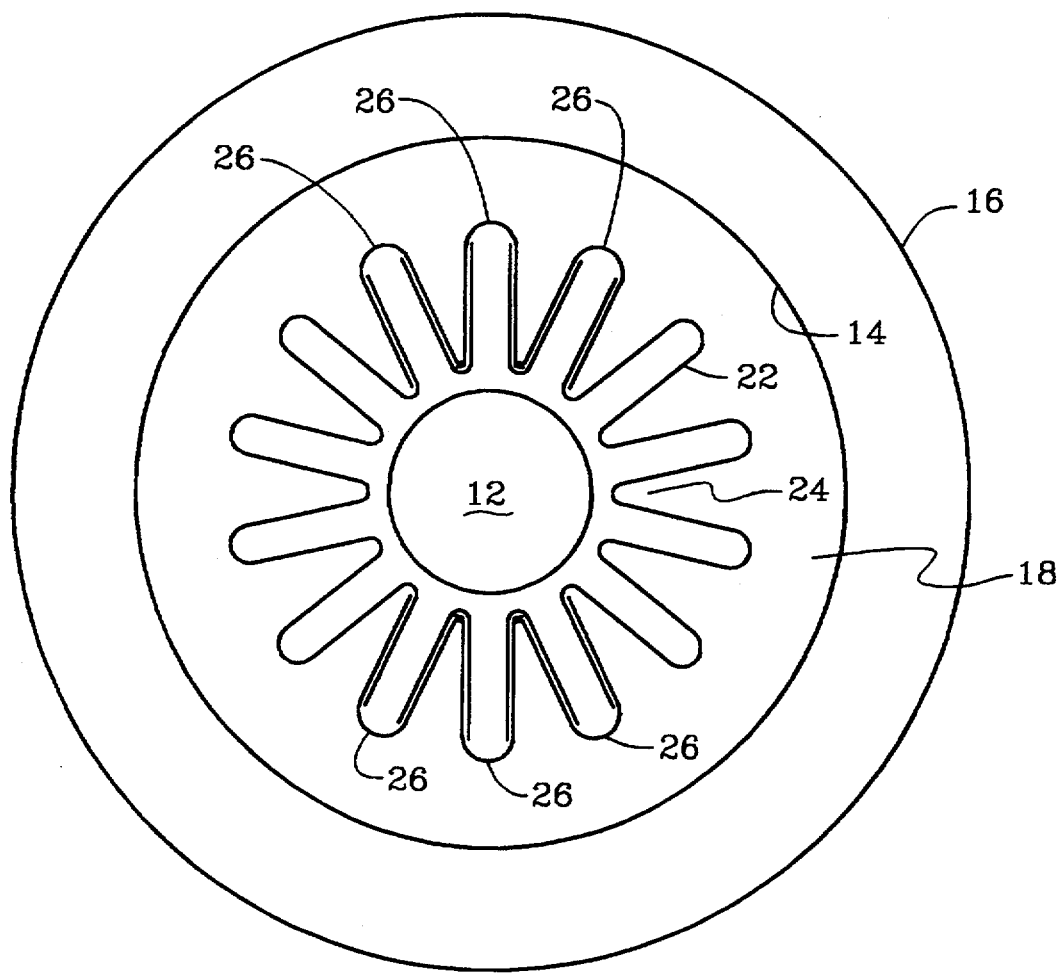
FIG. 2 is a cross-sectional schematic view in the outlet plane of the turbine mixer nozzle along lines 2—2 of FIG. 1 and viewed in the direction of the arrows.

As shown in FIG. 2, the primary exhaust nozzle 12 is formed by a plurality of lobes 22, through which the hot gases generated by the turbine engine 10 exit. Between each lobe there is a channel 24 and the by-pass flow (again at relatively low temperature) flows through these channels. The lobes 22 and channels 24 are adapted to guide respectively the hot gases (also called the core flow of the engine) and the cold gases (called the fan flow) toward each other, so that these two gas flow paths are caused to mix downstream of the primary exhaust nozzle 12.

As shown in FIGS. 1 through 3, and FIGS. 6 and 7, the primary nozzle 12 has the capability of having its exit area increased in different ways. In the embodiments shown, this increase in the area is achieved geometrically by means of movable lobes 26 which are hinged on their upstream end. In their retracted positions (FIG. 2), the exit area of the hot gases through the plurality of lobes 22 is at a minimum, and the thrust reverser doors 20 are in the stowed configuration (the solid line position in FIG. 1). In their fully extended positions (FIG. 3), the lobes 26 increase the exit area of the primary nozzle 12 through which flow the hot gases generated by the turbine engine. This results in a changing of substantially the entire boundary between the hot and cold streams, moving that boundary radially outwardly. Although FIG. 2 shows two movable members of three lobes each, it will be understood that the number of movable lobes can vary as a function of the percentage of increased area which is targeted for the exhaust area of the primary mixer nozzle. This exhaust area may also be increased aerodynamically by establishing a divergence following the contour of the lobe(s) in a portion of the trailing edge of the mixer nozzle. This could be done by means of a retractable divergent extension member(s) normally housed out of the flow streams, typically in the structure surrounding the hot gas generator, when the thrust reverser is in the stowed configuration, and deployed to form a divergent extension(s) of the core nozzle, therefore changing the boundary between the hot and cold streams, and moving it radially outwardly when the thrust reverser is deployed.

Figure 3:
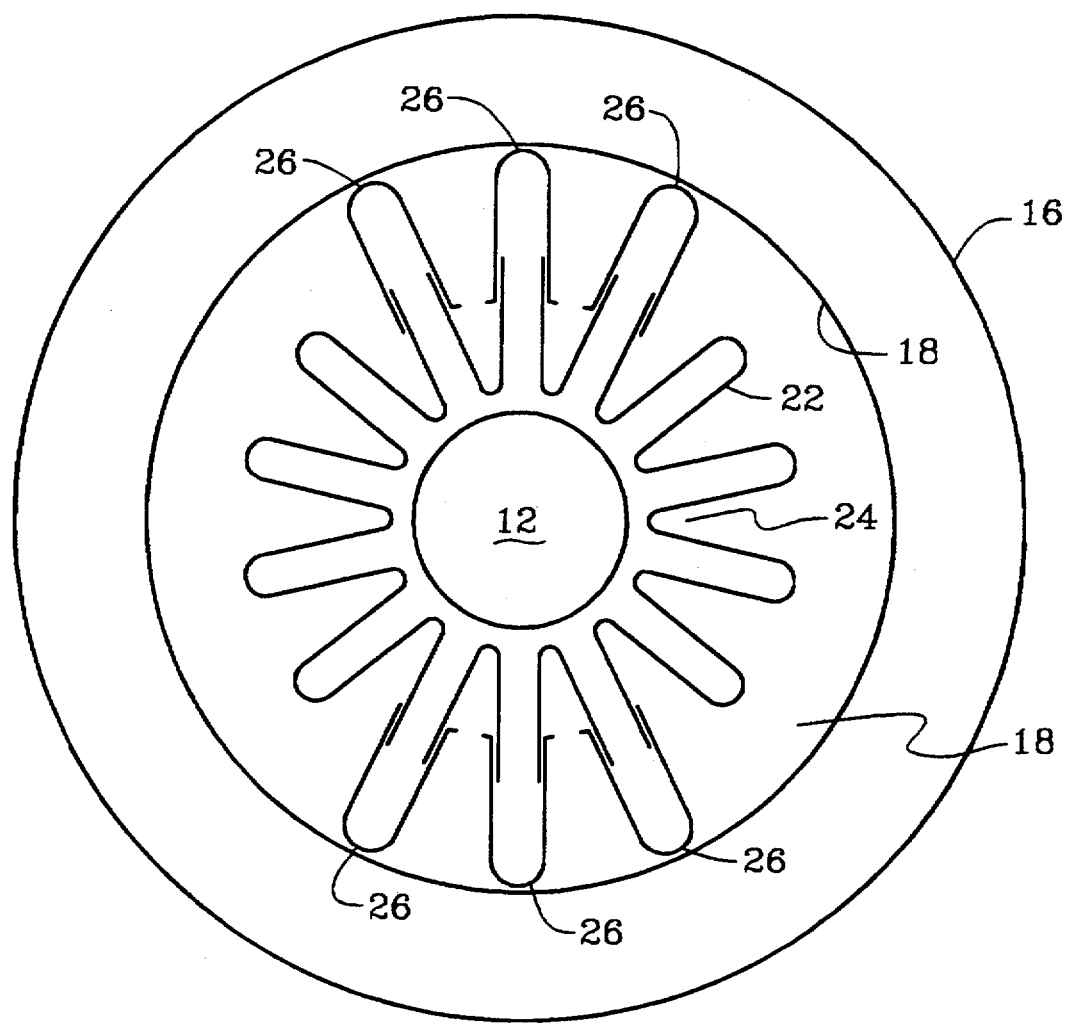
FIG. 3 is a view similar to, FIG. 2 with the exhaust area of the mixer nozzle increased.

In the geometric variation embodiment shown in FIGS. 1-3, when the thrust reverser is commanded to deploy, the movable lobes of the primary mixing nozzle are commanded to their fully extended position. As a result of the movable lobes 26 being positioned in their fully extended position, the exhaust area of the primary exhaust nozzle is increased, while the by-pass area of the annular conduit is decreased, because of the penetration of the movable lobes into the annular conduit 18, the boundary between the hot and cold flow is changed, and moved radially outwardly. Because of the increased exhaust area or the primary mixer nozzle, the total pressure or the hot gases is decreased, while the total pressure of the by-pass flow is increased because of the decrease of the by-pass area. The core area increase being greater in absolute value than the corresponding decrease of the fan by-pass area, the pressure of the core stream decreases more than the pressure increase in the fan flow. Therefor, the ratio of the total pressure of the by-pass fan flow to the total pressure of the core flow is significantly increased when the reverser doors are deployed. Also, the penetration of the movable lobes into the fan stream serves as an aerodynamic deflector to the fan stream without blocking of the fan stream. In the reversing state, by significantly decreasing the total pressure of the cold flow for a small increase of the total pressure of the fan flow, ensures that the by-pass or cold flow will have more energy and the ability to contain the core flow or hot gases generated by the turbine engine, thereby preventing the hot gases from impinging on the reverser structure. Therefor, the by-pass flow serves as a thermal shield for the reverser structure, allowing the use of conventional lightweight material such as an aluminum alloy or a composite material such as graphite for its construction. Overall weight of the thrust reverser assembly is greatly reduced, as well as the manufacturing costs related to the thrust reverser.

Figure 6:
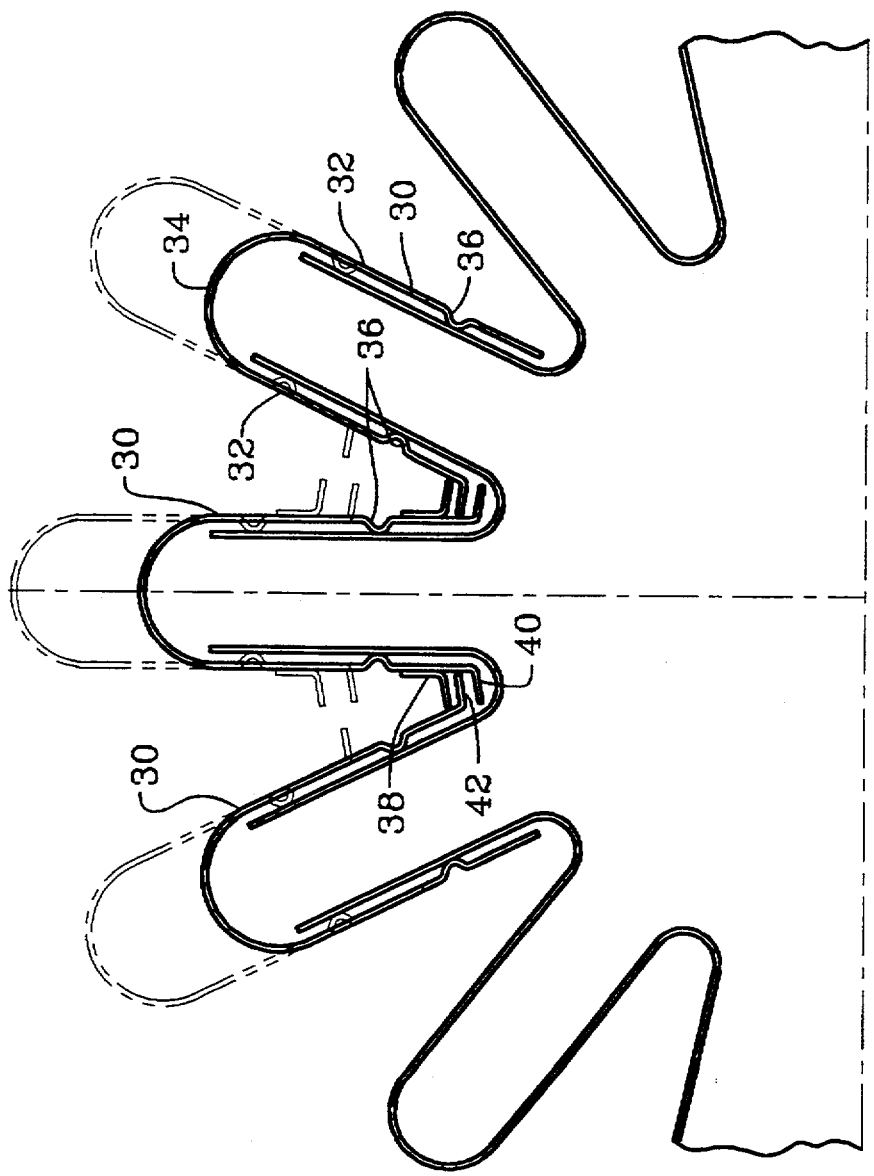
FIG. 6 is a cross-sectional view along lines 6—6 of FIG. 4 and viewed in the direction of the arrows.
Figure 7:
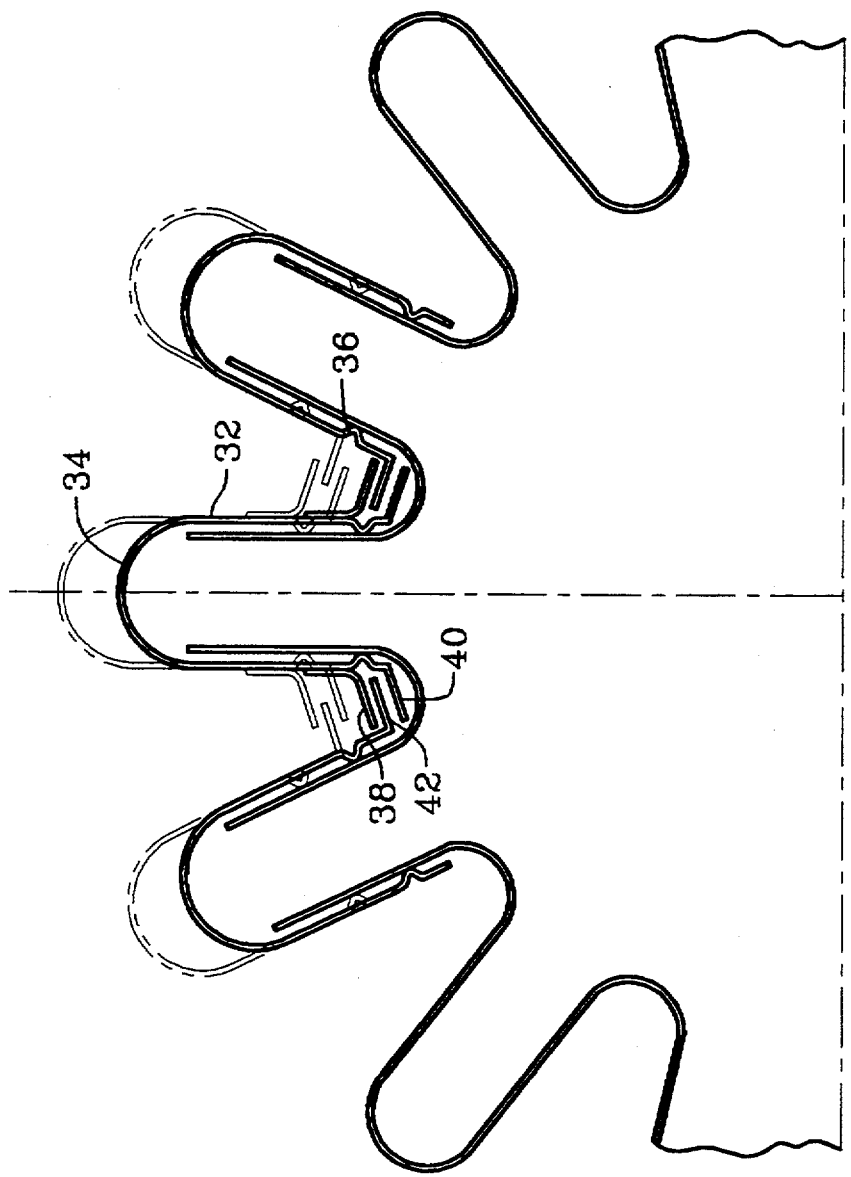
FIG. 7 is a cross-sectional view along lines 7—7 of FIG. 4 and viewed in the direction of the arrows.

With reference to FIGS. 6 and 7, one embodiment of the movable lobes is shown in greater detail. Each movable lobe is of the same shape of the fixed lobe that it covers, i.e. is composed of two flat walls 32 joined by a radius 34. This configuration, while presenting a geometric increase of the area of the core flow, also presents an aerodynamically efficient surface to the fan flow. Each flat wall 32 incorporates in its lower portion a metallic seal 36 which ensures both hot gas tightness between the walls of the movable lobes and the adjacent lobe of the fixed wall. In the movable multi-lobe arrangement as shown in FIGS. 2, 3, 6 and 7, the central movable lobe is the guide, while the two adjacent lobes are followers. Of course without departing from the spirit of the invention, the two outer lobes may be guides, and the middle lobe a follower.

To achieve the guide/follower operation of the lobes, the guide lobe is provided on each of its side walls 32 with a double shoulder 38, 40, while the follower lobes have a single shoulder 42 which engages the guide shoulders 38, 40. When the lobes have reached their fully opened position, on their downstream end the shoulder of the follower lobe may disengage the double shoulder of the guide lobe as shown in FIG. 3 and the dotted line position of FIG. 6, but the guiding characteristic of the lobes is still ensured as shown in FIG. 7 by the shoulders 38, 40 and 42 which in their upstream portion never become disengaged.

Still with reference to FIGS. 6 and 7, it is apparent that the shoulders 38, 40 and 42 also have the added function of changing the area of channel 18 through which the fan air (or cold flow) flows. The by-pass area variation is also achieved by the penetration of the movable lobes into the by-pass conduit, or other similar variations, moving the lobes or shoulders between the lobes. The shoulders 38, 40 and 42 serve also as aerodynamic deflectors to the fan flow.

When the movable lobes are positioned to their fully extended position as seen in FIGS. 3 and 6, they restrict the area of the by-pass conduit, guide and deflect the fan flow, and increase the area of the mixer nozzle. As a result, the ratio of the total pressure of the by-pass flow over the total pressure of the core flow is increased, which in turn, and together with the deflection of the fan flow, prevent the core flow-from impinging on the thrust reverser structure when it is deployed, as discussed above.

Another feature of the present invention allows for increasing the area of the central mixing nozzle in the forward thrust mode, particularly during take-off under high outside air temperatures. In such cases, it is beneficial that the final exhaust nozzle be either a thrust reverser which incorporates a variable exhaust area nozzle system as described in U.S. Pat. No. 5,181,676, or a non-reversing variable exhaust nozzle as described in copending application Ser. No. 07/741,647. If the rear exit of the nacelle is equipped with a thrust reverser which integrates a variable exhaust area nozzle, such as the type described in U.S. Pat. No. 5,181,676, then in the forward thrust mode, the exhaust area of the mixer nozzle can be adjusted together with the exhaust area of the reverser. This results in increased take-off thrust under high outside air temperature. The increase of the exit area of the mixer nozzle would also have a direct effect on the operating temperature of the engine, by decreasing it. This temperature decrease happens at the most critical engine power setting, i.e. at maximum engine thrust which are the most adverse engine operating conditions. Any decrease of the maximum engine operating temperature has a direct effect on the engine life, significantly increasing the life.

In the thrust reversing mode, the exhaust area of the mixer nozzle is increased as described previously in order to increase the value of the ratio of the total pressure by-pass flow over core flow, so that the core flow never impinges on the reverser structure, allowing use of conventional aluminum alloy or composite materials. If the rear end of the nacelle is equipped with a non-reversing variable exhaust nozzle as described in U.S. Pat. No. 5,221,048, then in the forward thrust mode, which is the only mode of operation in that case, the exhaust area of the mixer nozzle is adjusted together with the exhaust area of the final variable exhaust nozzle. As a consequence, take off thrust under high outside air temperature conditions is increased and maximum engine operating temperature is decreased, thus considerably improving the engine life.

Figure 4:
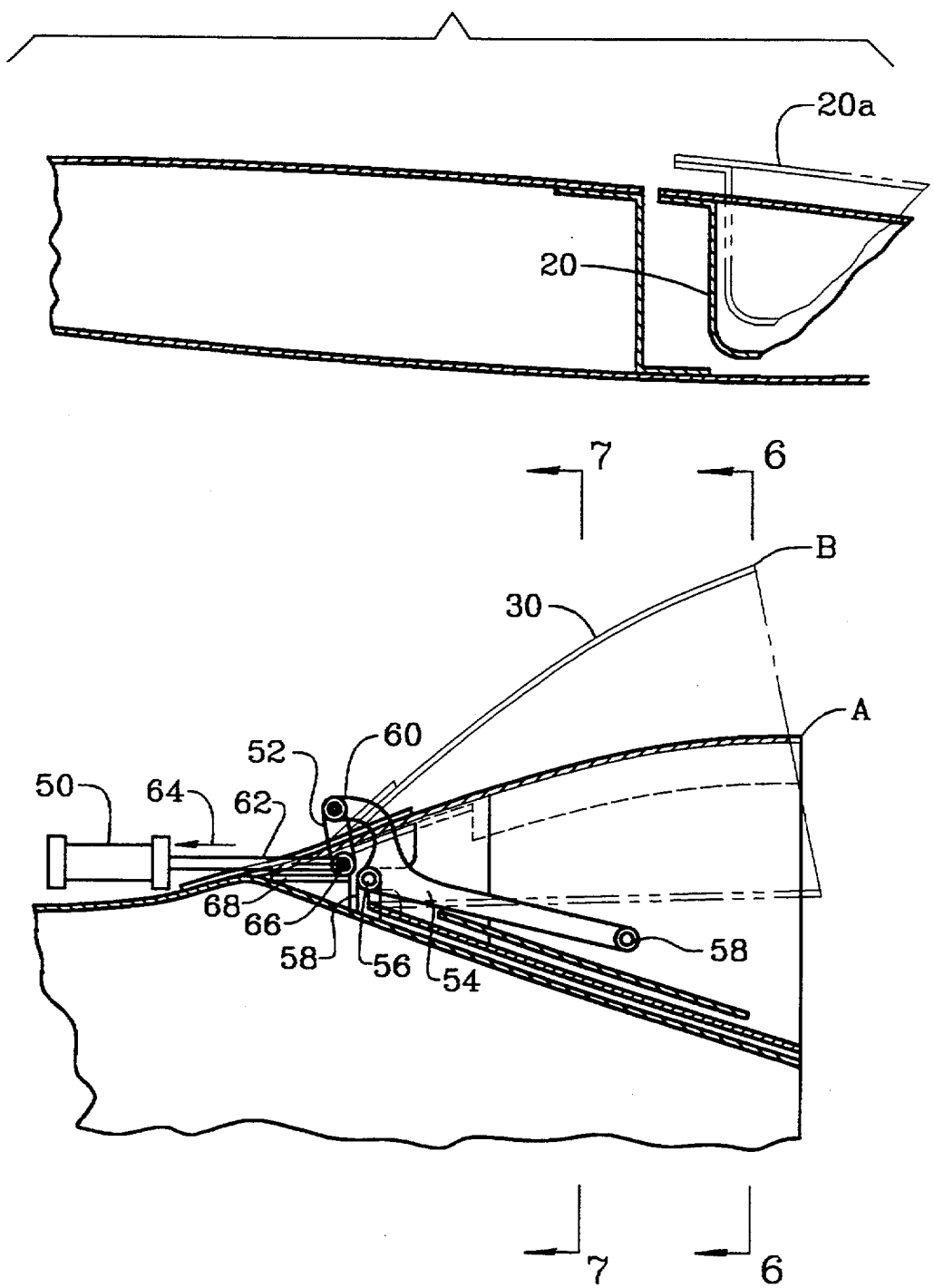
FIG. 4 is a magnified cross-sectional of a portion of the mixer nozzle showing the lobe in its retracted and deployed position.

Referring to FIG. 4, the control system for the angular positioning of the movable lobes is shown. This system comprises at least one actuator 50 connected to linkage members 52 and 54. Each movable lobe is hinged on each side of its respective wall 11 (FIG. 6) on its upstream end through hinge fitting 56. These hinge fittings 56 are supported by hinge support 58 attached to the bottom fixed wall of the channel 24. The arm 54 which controls the angular positioning of the guide lobe is hinged on the same axis of rotation as the guide lobe. One end 58 of this arm 54 is attached to the movable lobe 30, while the other end 60 is connected to link 52. When the movable lobe 30 is in position A (small exit area of the mixer nozzle) then the linkage members 52 and 54 are self-locked in that position because of the over center relationship of link 54 and the rod 62 of the actuator 50.

When the actuator 50 is pressurized in the direction of arrow 64, the rod 62 retracts causing its end 66 to follow the guide 68, forcing the lobe 30 to close a little more until connecting link 52 has overcome the overcenter position of the linkage arrangement. The guide lobe can then rotate freely, driven by its control actuator 50 to reach position B. The follower lobes as described previously reach a similar position since they are driven by the guide lobe.

If the system is operating in the reverser mode, when the reverser door 20 starts the deployment sequence represented by the dotted lines 20a.

If the system is operating in the forward thrust mode, then the area increase of the mixer nozzle is achieved in conjunction with the area increase of the final exhaust nozzle as in U.S. Pat. No. 5,181,676 or U.S. Pat. No. 5,221,048. In such a case, it would be beneficial that the control system of the guide lobe use a screw and nut so that it can be positioned to any intermediate angular position required to achieve targeted performance.

Figure 5:
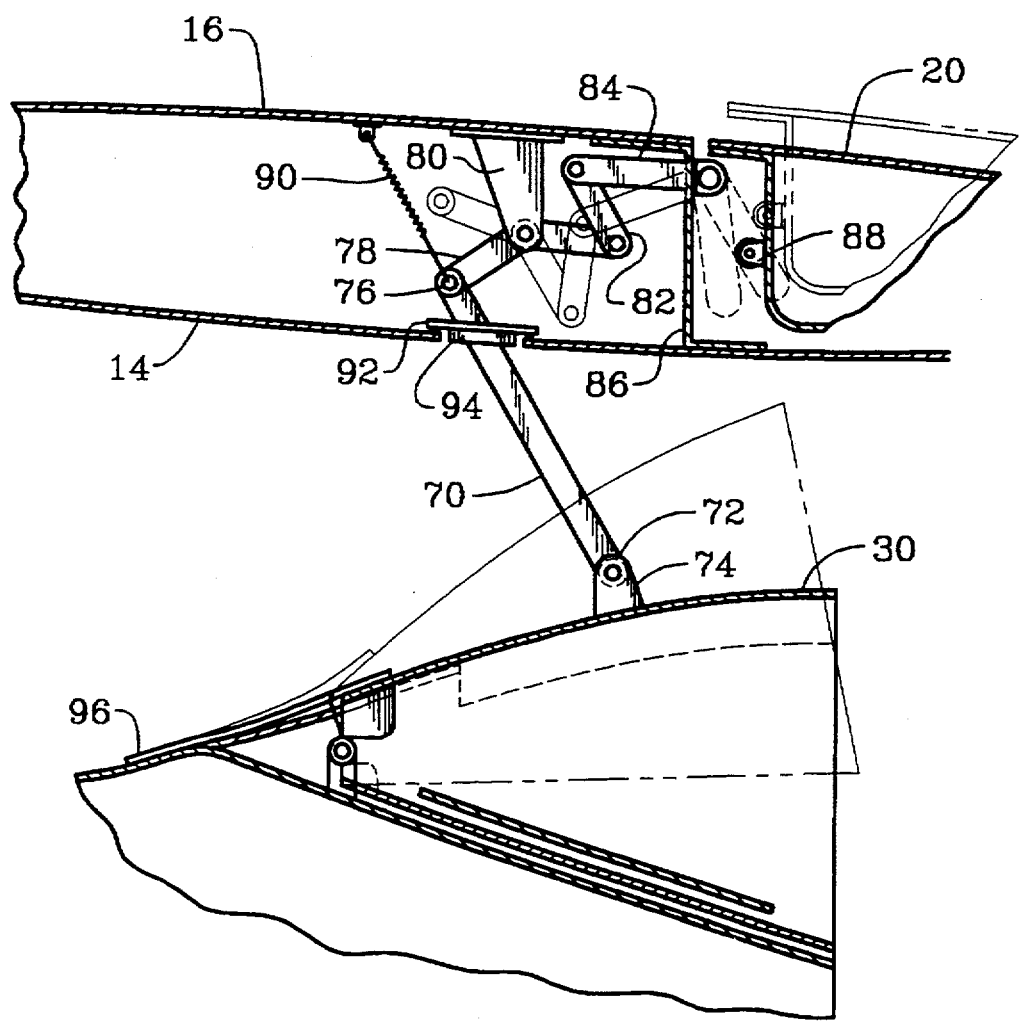
FIG. 5 is a view similar to FIG. 4, showing an alternate embodiment of the invention.

FIG. 5 shows a variation of the control of the angular position of the guide lobe. The control system is completely contained in the box formed by the inner skin 14 and the outer skin 16 of the fixed structure surrounding the hot gas generator. This embodiment has the added benefit of completely placing the control system in a "cold" environment, i.e. out of the hot gas flow. A profiled link 70, to reduce drag, has one end 72 hinged on a fitting 74 attached to the guide lobe 30, while its other end 76 is hinged inside the box formed by the inner skin 14 and outer skin 16, to a V-shaped crank 78. The crank 78 is hinged on a support fitting 80 attached to the outer skin 16 of the fixed structure surrounding the hot gas generator.

The other arm of the V-shaped crank 78 is connected to a link 82 which in turn is connected to a V-shaped lever 84 hinged on the close-out structure 86 of the inner skin 14 and outer skin 16. The lever 84 has one of its arms always remaining outside of the box formed by the skins 14, 16, and the close out 86. Still with reference to FIG. 5, the angular position of the lever 84, and therefor the angular position of the guide lobe 30, is directly controlled by the reverser door 20. When the reverser door starts its deployment sequence, the wheel 88 liberates the lever 84 which, through the combined action of spring 90, the linkage arrangement and the pressure acting in the guide and follower lobes, causes the complete system controlling the angular position of the guide lobes to rotate to the position shown by dotted lines. When the reverser door is moving from its deployed position to its stowed position, then when wheel 88 comes in contact with the V-shaped lever 84, forcing it to return to its original (solid line) position, wheel 88 contacts the V-shaped lever 84 forcing it, and the complete system, to return to its original (solid line) position.

It will be noted that while link 70 penetrates the inner skin 14, fluid tightness is still ensured through seal 92 and cover 94, the cover 94 being part of link 70. A leaf spring seal 96 ensures hot gas fluid tightness for any angular position of the movable lobes.

The system described in FIG. 5 can only operate with a thrust reverser in the reverse mode. If the system is required to be operated in the forward thrust mode as well, then an actuator controlling directly the angular position of the V-shaped lever 78 would need to be provided. In such case, link 82, lever 84 and spring 90 are deleted.

Figure 8:
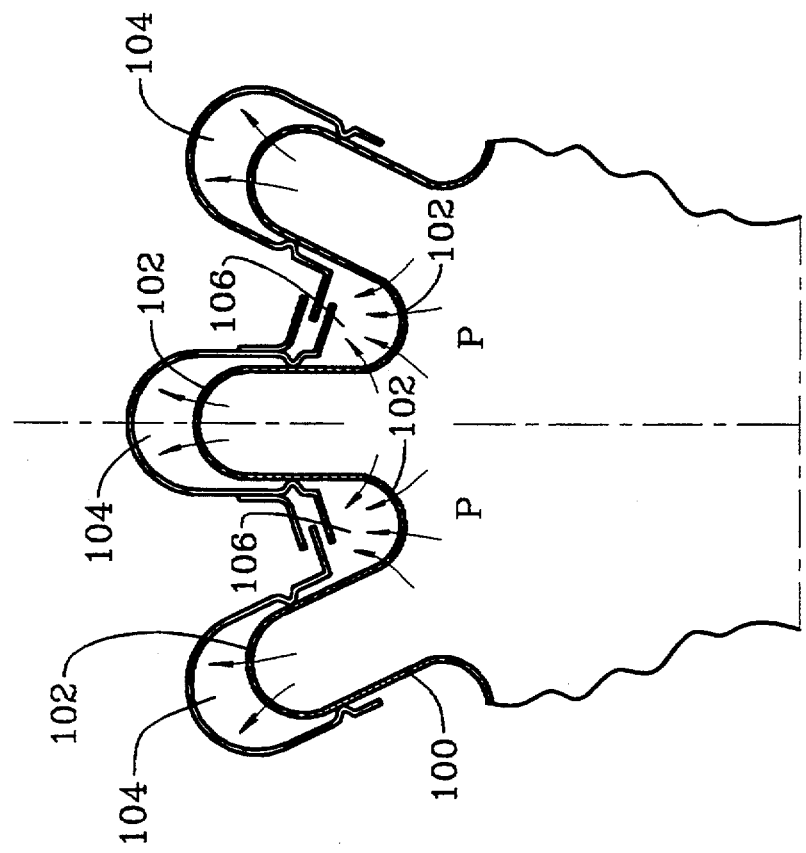
FIGS. 8 and 8a are views respectively similar to FIGS. 4 and 6 of another alternative embodiment.
Figure 8A:
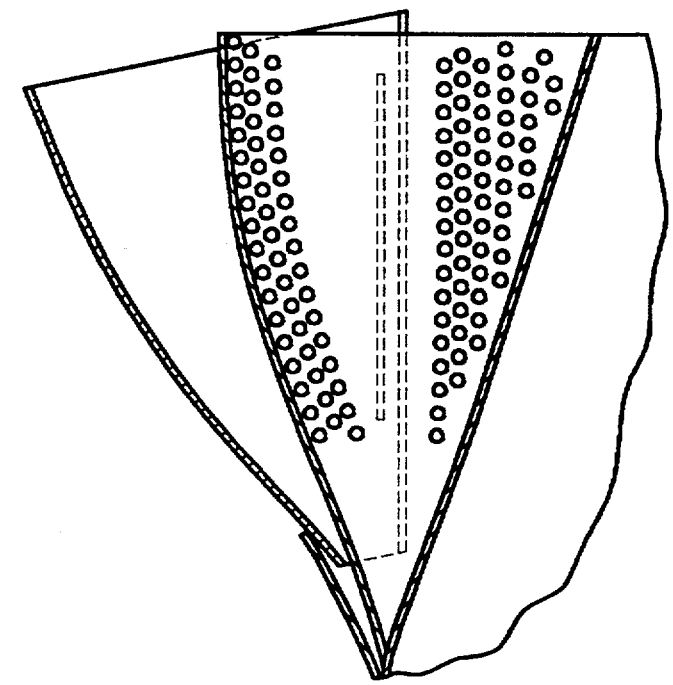

FIG. 8 shows a variation of the mixer nozzle. Three fixed lobes 100 are provided with a plurality of perforations 102 on their upper portions and lower portions. These perforations 102 are covered by the movable guide and follower lobes when they are retracted. When the guide and follower lobes are controlled to their deployed position through one of the control systems previously described, the internal pressure P acting inside the mixer nozzle decreases because of the opening of cavities 104 and 106. At the same time, the by-pass area 18 of the cold flow conduit is decreased because of the penetration of the movable lobes in that conduit. The total pressure of the cold flow is therefor increased. The ratio of the total pressure of the cold flow to the total pressure of the hot flow is therefore increased in the reverser mode, ensuring that the hot flow will not impinge on the reverser structure.

Figure 9:
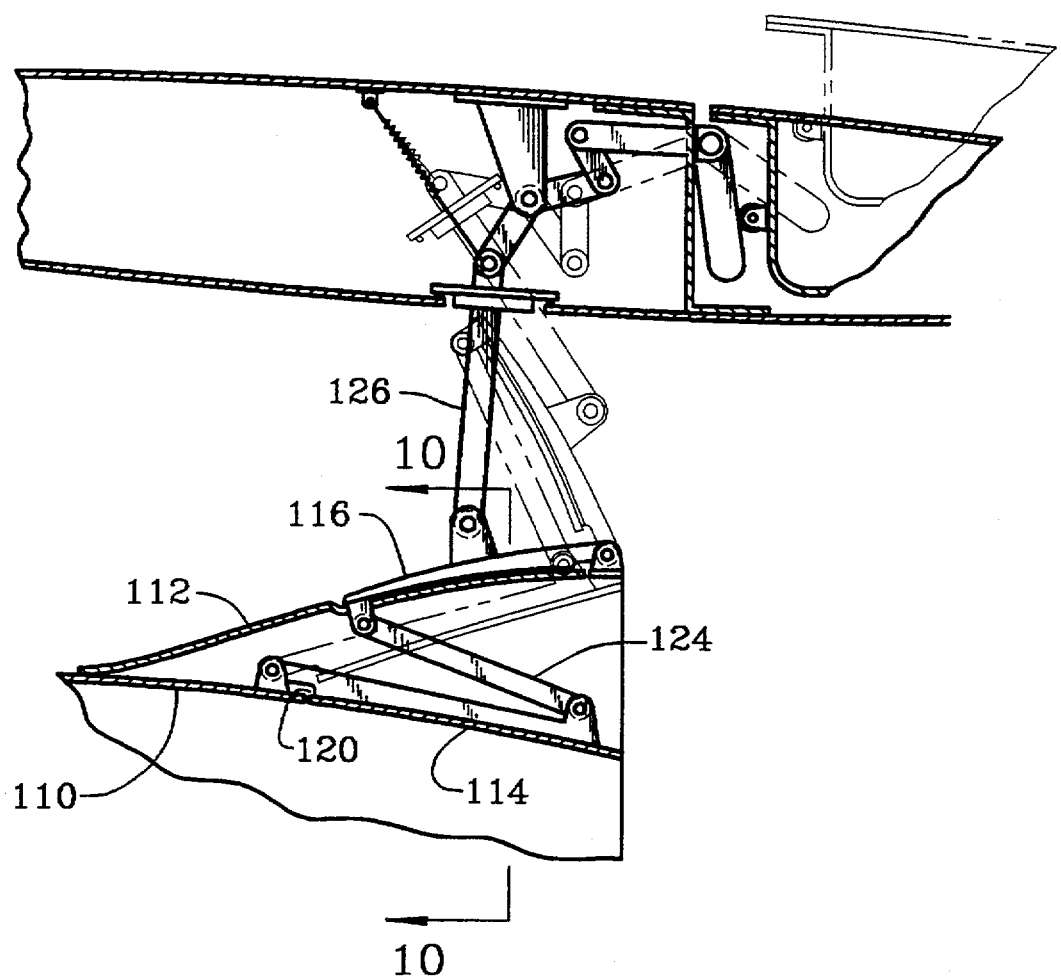
FIG. 9 is a cross-sectional schematic view of the rear portion of a turbine engine fitted with a central non-mixing nozzle.
Figure 10:
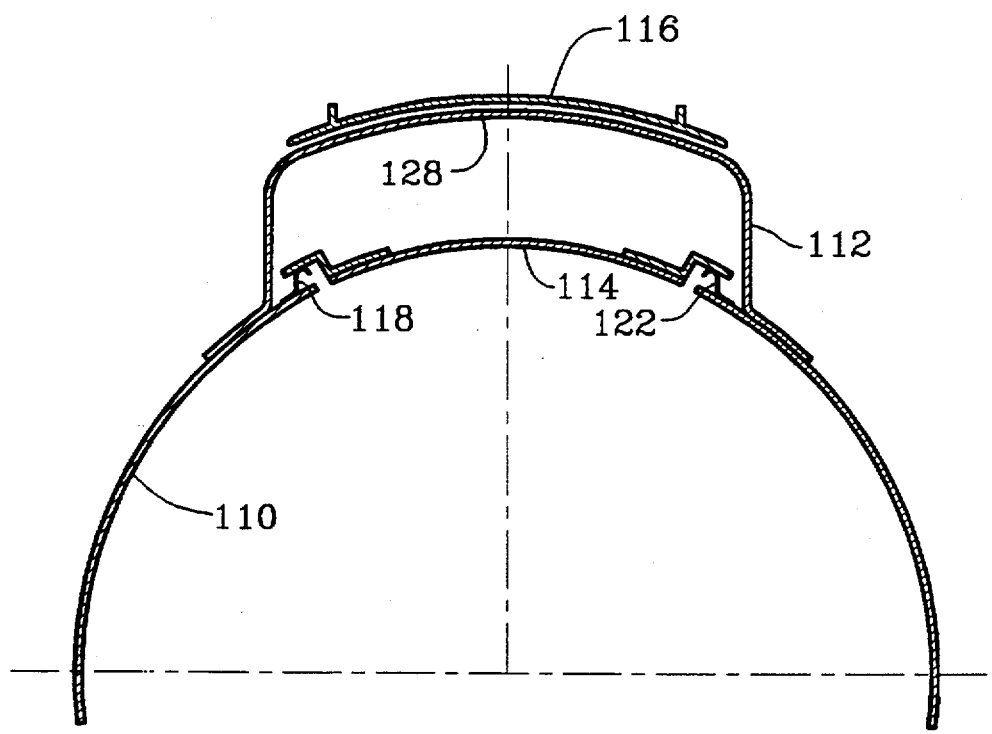
FIG. 10 is a cross-sectional view along lines 10—10 of FIG. 9 and viewed in the direction of the arrows.
Figure 11:
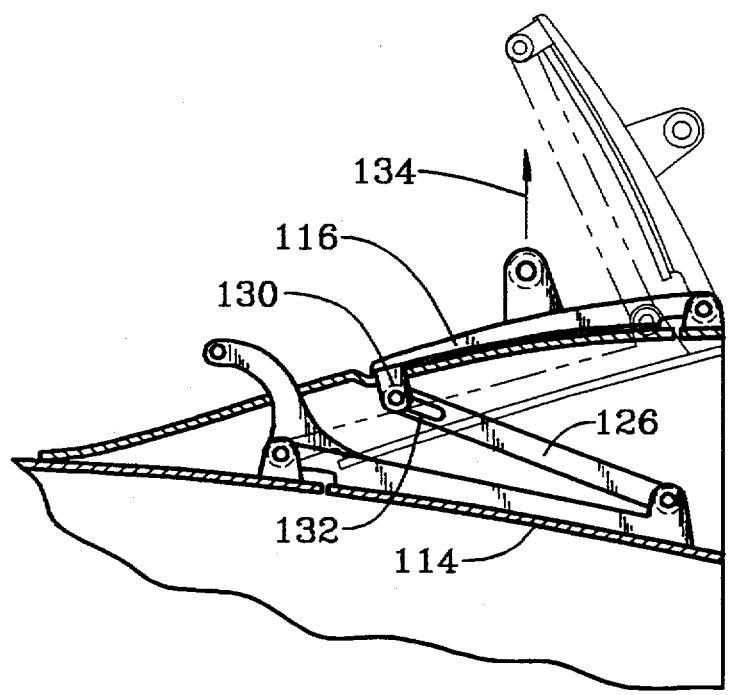
FIG. 11 is a view similar to FIG. 9 showing another embodiment of the invention.

Referring to FIGS. 9, 10 and 11, the central generator is provided with a frustoconical nozzle (a non-mixing nozzle). With this type of primary nozzle, the hot gases and the cold gases are no longer forced to mix. As seen in FIGS. 9 and 10, the wall 110 of the conical nozzle is cut at its upper and lower parts. The structural integrity of the nozzle is re-ensured by the housing 112. Two flaps 114 and 116 are installed. Flap 114 deploys inside the housing 112, while flap 116 deploys outside of the housing 112. Flap 114 is hinged at its upstream end on wall 110; when in the non-deployed position (solid line position in FIGS. 9 and 10, it ensures the smooth profile continuity of the inner contour of the wall 110. Metallic seals 118, 120 and 122 are provided at the periphery of the flap 114 to ensure fluid tightness with respect to hot gases. Flap 116 is hinged at its downstream end on housing 112. Although the hinge point of flap 116 is shown as being outside of housing 112, it can be located inside of housing 112 without departing from the spirit of the invention.

When in the non-deployed position (solid line position of FIG. 9), flap 114 ensures the profile continuity or housing 112. Flaps 114 and 116 are linked by a linkage 124. The angular position of flap 116 is controlled by a profiled link 126 in a similar way as the control system shown in FIG. 5. The main difference from FIG. 5 is that when flap 114 starts its deployment driven by the link 126, then in drives with it flap 116 because of the link 124 which can move through the slot 128 in housing 112. When both flaps are deployed, the total pressure of the hot gases is decreased because of the increase of area of the nozzle, and the total pressure of the cold gases is increased because of the decrease of the by-pass area resulting from the deployment of the flap 116 in the by-pass conduit 18. As a result of the above, the ratio of the total pressure of the by-pass flow to the total pressure of the core flow is increased, preventing the hot gases from impinging on the structure of the reverser door. The by-pass flow or cold gas stream serves as a thermal shield to the reverser structure. Again, the system is completely controlled by the reverser door.

This exhaust area may also be increased aerodynamically by establishing a divergence in a portion of the trailing edge of the nozzle. This could be done by means of a retractable divergent extension member(s) normally housed out of the flow streams, typically in the structure surrounding the hot gas generator, when the thrust reverser is in the stowed configuration, and deployed to form a divergent extension(s) of the core nozzle, therefore changing the boundary between the hot and cold streams, and moving that boundary radially outwardly when the thrust reverser is deployed.

If it is desired to adjust, in the forward thrust mode, the exhaust area of the frustoconical hot nozzle, then it becomes necessary to independently control the flaps 114 and 116, as shown in FIG. 11. Flap 114 is controlled by a similar system as the one described in FIG. 4. During the angular rotation of flap 114 from its stowed position (solid line) to its deployed position (dotted lines), the link 126 is allowed to translate on the connecting pin 130 of flap 116 because of the slot 132 in the link 126. During that motion of flap 116, flap 116 remains in the stowed configuration (solid lines). Flap 114 can be returned through its control actuator (not shown) to its stowed position (solid lines). Flap 116 can be deployed through a linkage arrangement symbolized by arrow 134 (similar to the linkage shown in FIG. 9). Flap 114 needs to be positioned to its deployed position before flap 116 starts its deployment.

While this invention has been described as having certain preferred features and embodiments, it will be understood that it is capable of still further variation and modification without departing from the spirit of the invention, and this application is intended to cover any and all variations, modifications and adaptations as may fall within the spirit of the invention and the scope of the appended claims.

I claim:

1. A thrust reverser system for a turbine engine of the type having on a longitudinal axis a central hot gas generator nozzle conducting a relatively hot core flow and a fan duct conducting a relatively cold fan flow surrounding the hot flow, comprising a pair of thrust reverser door members, each of said door members being pivotally mounted on a pivot axis which is substantially diametrically positioned with respect to the exhaust of the engine so as to pivot between a stowed position in which said door members are out of the direct path of exhaust from the engine and a deployed position in which said door members are in the path of the engine exhaust for deflecting the exhaust and creating a braking thrust, means for simultaneously decreasing the total pressure of said core flow and increasing the total pressure of said fan flow by increasing the area of said hot gas generator nozzle at the discharge end thereof.

2. A thrust reverser system as in claim 1 and wherein said means for decreasing the total pressure of said core flow and increasing the total pressure of said fan flow comprises hot nozzle variation means for changing the boundary between the core flow and the fan flow and moving said boundary radially outwardly, 3. A thrust reverser system as in claim 2 and wherein said hot nozzle variation means comprises means for deflecting a portion of the cold flow at the discharge of the hot gas generator nozzle.

4. A thrust reverser system as in claim 3 and wherein said hot gas generator nozzle is a mixer nozzle having a plurality of lobes at the boundary between the core flow and the fan flow.

5. A thrust reverser system as in claim 4 and including means for increasing the outlet area of at least one of said lobes.

6. A thrust reverser system as in claim 5 and wherein said at least one of said lobes has an opening formed therein, and means associated with said at least one of said lobes for selectively expanding the outlet area associated with said at least one of said lobes.

7. A thrust reverser system as in claim 4 and including means for simultaneously increasing the outlet area of at least some of said lobes.

8. A thrust reverser system as in claim 7 and wherein said lobes are formed by alternating peaks and valleys, said peaks being radially outward of said valleys, a plurality of said peaks being open at the ends thereof, cover means positioned over each of said open peaks and movable radially for varying the outlet area of a plurality of said lobes substantially simultaneously.

9. A thrust reverser system as in claim 8 and wherein said cover means comprises a plurality of cover members, means interconnecting said cover members for simultaneous movement, and actuator means acting directly on one of said cover members for moving each of said cover members.

10. A thrust reverser system as in claim 9 and wherein said interconnecting means is positioned in said valleys.

11. A thrust reverser system as in claim 9 and including means interconnecting said cover members and said thrust reverser doors, whereby upon deployment of said thrust reverser doors, said cover members are moved for increasing the area of said hot generator nozzle.

12. A thrust reverser system as in claim 2 and wherein said hot nozzle variation means comprises a pair of aerodynamic deflectors, one of said deflectors comprising a first flap pivotally connected to said hot gas nozzle for increasing the effective area of said hot gas nuzzle, and the other of said deflectors comprising a second flap pivotally connected to said hot gas nozzle for aerodynamically deflecting a portion of said fan flow.

13. A thrust reverser system as in claim 12 and wherein said deflectors are disposed in a housing forming an aerodynamic extension of said hot gas generator nozzle.

14. A thrust reverser system as in claim 13 and wherein said deflectors are interconnected.

15. A thrust reverser system as in claim 13 and wherein said deflectors are independently movable.

16. A thrust reverser system as in claim 2 and wherein said hot nozzle variation means comprises aerodynamic deflection means for changing the boundary between said core flow and said fan flow.

17. A thrust reverser system for a turbine engine of the type having on a longitudinal axis a central hot gas generator nozzle conducting a relatively hot core flow and a fan duct conducting a relatively cold fan flow and surrounding the hot flow, comprising a pair of thrust reverser door members, each of said door members being pivotally mounted on an axis which is substantially diametrically positioned with respect to the exhaust of the engine so as to pivot between a stowed position in which said doors are out of the direct path of the engine exhaust and a deployed position in which said door members are in the path of the engine exhaust for deflecting the exhaust and creating a braking thrust, means for changing the boundary between the core flow and the fan flow and moving said boundary radially outwardly for simultaneously decreasing the total pressure of said core flow and increasing the total pressure of said fan flow by increasing the area of said hot gas generator nozzle at the discharge end thereof.

18. A thrust reverser system as in claim 17 and wherein said means for changing the boundary between the core flow and the fan flow comprises means for varying the outlet area of the hot gas generator nozzle.

19. A thrust reverser system as in claim 18 and wherein said means for varying the outlet area of the hot gas generator nozzle comprises aerodynamic flow varying means.

20. A thrust reverser system as in claim 18 and wherein said means for varying the outlet area of the hot gas generator nozzle comprises geometric flow varying means.

21. A process for modifying the flow of gas through a turbine engine of the type having a central relatively hot gas generator nozzle conducting a hot core flow and an annular duct for conducting a relatively cold fan flow surrounding the hot flow for improving the performance of said engine, said process comprising decreasing the total pressure of said hot core flow and simultaneously increasing the total pressure of said fan flow for moving the boundary between said hot core flow and said fan flow radially outwardly within said duct.

22. A process as in claim 21 and wherein said engine is of the type including a target type thrust reverser mounted in the exit path of the exhaust gas flow, and including carrying out said step of decreasing the total pressure of said hot care flow and increasing the total pressure of said fan flow upon deployment of said thrust reverser.

23. A process as in claim 21 and including carrying out said step of decreasing the total pressure of said hot core flow and increasing the total pressure of said fan flow by varying the outlet area of the hot gas generator nozzle.

24. A process as in claim 21 and including carrying out said step of decreasing the total pressure of said hot core flow and increasing the total pressure of said fan flow by aerodynamically increasing the outlet area of the hot gas generator nozzle.

25. A process as in claim 21 and including carrying out said step of decreasing the total pressure of said hot core flow and increasing the total pressure of said fan flow by increasing the outlet area of the hot gas generator nozzle.

* * * * *